United States Patent [19]

Duchateau et al.

[11] 4,422,893
[45] Dec. 27, 1983

[54] METHOD OF MANUFACTURING MIRRORS AND MIRRORS SO OBTAINED

[75] Inventors: Jacques Duchateau, Recquignies; Maurice Nicolas, la Raboliere, both of France

[73] Assignee: B F G Glassgroup, Paris, France

[21] Appl. No.: 140,591

[22] Filed: Apr. 15, 1980

Related U.S. Application Data

[63] Continuation of Ser. No. 919,958, Jun. 28, 1978, abandoned.

[30] Foreign Application Priority Data

Jun. 28, 1977 [GB] United Kingdom ............... 27026/77
Mar. 20, 1978 [GB] United Kingdom ............... 27026/78

[51] Int. Cl.³ .................. B32B 31/00; B32B 3/14; B32B 3/16; G02B 5/08
[52] U.S. Cl. .................................. 156/232; 156/249; 156/285; 156/561; 156/297; 156/71; 428/49; 428/914; 350/292; 350/294; 350/296
[58] Field of Search ............... 156/230, 232, 297, 245, 156/246, 249, 285, 241, 63, 104, 247, 108, 212, 304.3, 224, 561, 239, 71, 289, 323; 350/310, 320, 292, 293, 296, 294, 109; 264/1.1, 1.2, 1.3

[56] References Cited

U.S. PATENT DOCUMENTS

| | | | |
|---|---|---|---|
| 3,298,886 | 1/1967 | Vevoda | 156/285 |
| 3,676,248 | 7/1972 | Swartz | 156/235 |
| 3,841,738 | 10/1974 | Caplan | 350/293 |
| 3,856,384 | 12/1974 | Kryzhanousky | 350/288 |
| 4,140,567 | 2/1979 | Beecher | 156/235 |
| 4,195,913 | 4/1980 | Dourte et al. | 350/292 |

Primary Examiner—Edward C. Kimlin
Assistant Examiner—Louis Falasco
Attorney, Agent, or Firm—Cushman, Darby & Cushman

[57] ABSTRACT

A method of manufacturing a mirror which comprises the steps of selecting a former of shape complementary to the shape of the desired mirror surface, applying to such former a plurality of mirror elements each constituted by a glass element having a reflective coating on one face thereof, and applying and adhesively bonding directly to such mirror elements a preformed, substantially rigid, unitary structural support.

20 Claims, 7 Drawing Figures

FIG.1
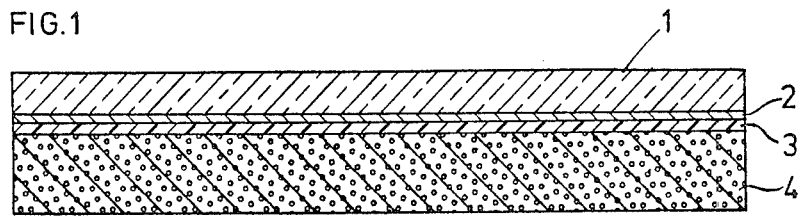
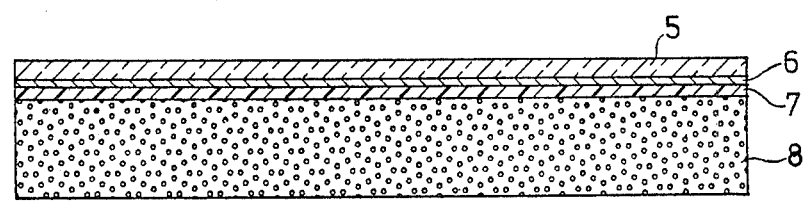
FIG.2
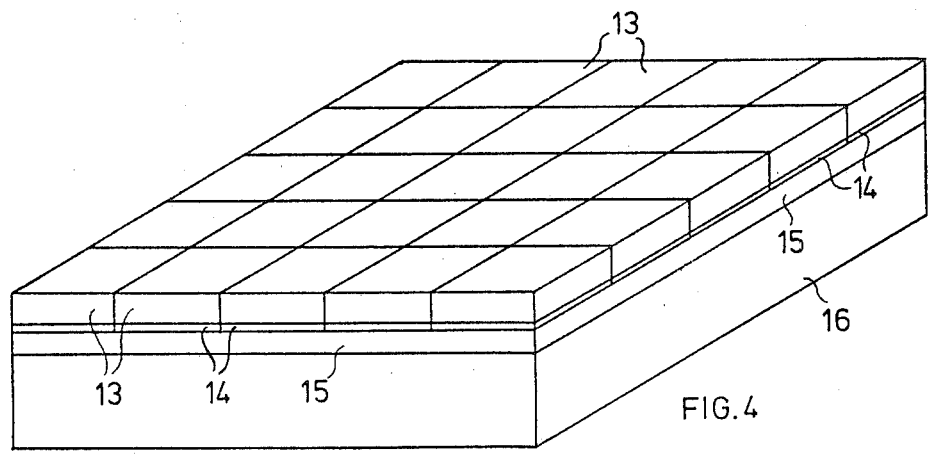
FIG.4
FIG.3
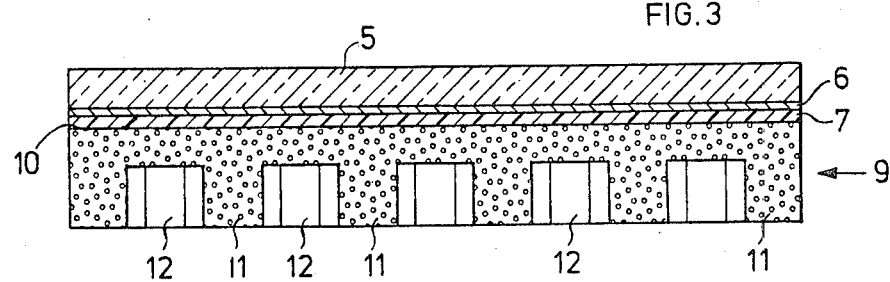

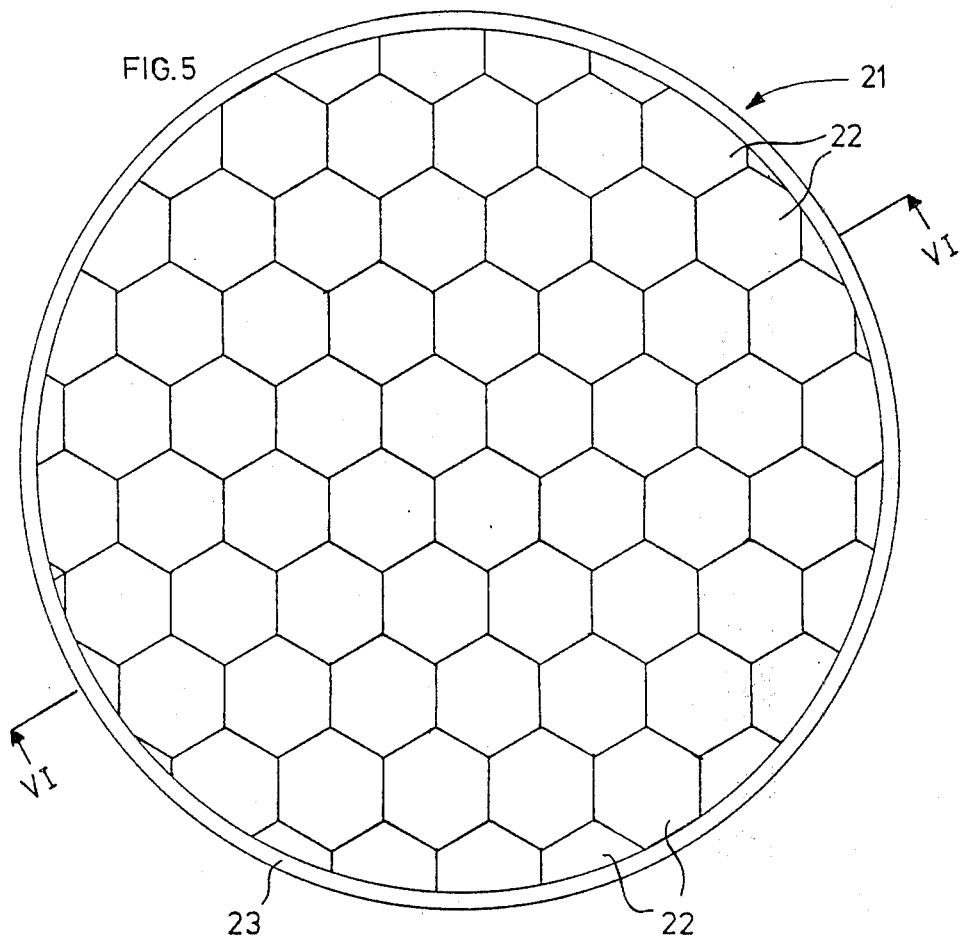
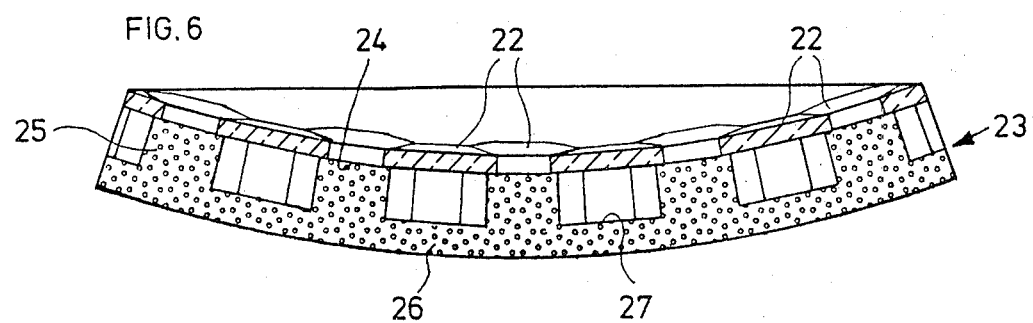

METHOD OF MANUFACTURING MIRRORS AND MIRRORS SO OBTAINED

This is a continuation of application Ser. No. 919,958 filed June 28, 1978 abandoned.

This invention relates to a method of manufacturing mirrors and to a novel form of mirror manufactured by the method.

Mirrors constituted by a glass sheet having a reflective coating of, for example, silver are of course very well known. Particularly in the case of large mirrors, they suffer from the disadvantage that they must often be made unduly heavy in order to reduce the risk of their breaking, and the weight and thickness of glass required can make such mirrors unsuitable for use in some circumstances.

It is an object of the present invention to provide a method of constructing a mirror which enables mirrors of large area to be made from thin glass.

According to the principles of the present invention this objective is obtained by performing the steps of selecting a former of shape complementary to the shape of the desired mirror surface, applying to such former a plurality of mirror elements each constituted by a glass element having a reflective coating on one face thereof and applying and adhesively bonding directly to such mirror elements a preformed, substantially rigid, unitary structural support.

Because of the use of a substantially rigid, unitary support, that is a support consisting of a single member, the strength of the mirror does not depend exclusively on the strength of the mirror elements, and accordingly, mirrors of any size can be made using thin glass.

The unitary support may be of any appropriate material, for example, it may be of concrete, metal or plastics material, or of vitreous material, that is to say glass or vitrocrystalline material or of a ceramic or vitroceramic material.

It is most convenient for each glass element to be constituted by a sheet, and the invention enables mirrors of any size to be manufactured from thin glass sheets, for example, sheets 2 mm or less in thickness, as is preferred. The glass sheets constituting the elements may conveniently be about 1 mm thick.

Preferably, the mirror elements are bonded to the support with their reflective coatings located between the support and their glass elements. This protects the reflective coatings from damage, and when this feature is combined with the use of thin glass sheets as is preferred, little incident radiation will be absorbed in the mirror which is very important in some circumstances.

The coated glass elements themselves may be flat or curved, and a mirror made by the method of the invention may be flat or curved. For example, a parabolic mirror may be made by bonding a plurality of flat coated glass elements to a suitable shaped support.

Advantageously the support has a cellular structure. A cellular support will have a comparatively low weight for a given rigidity or stiffness and can serve to give rigid support to a plurality of glass elements even when these are very thin. Preferably such support is formed as an integral molding comprising a base and an upstanding network of ribs defining the walls of a honeycomb cell structure. This is a very convenient way of making the support.

In some embodiments of the invention, especially where the mirror is built up as a curved structure of a plurality of flat glass elements bonded to the body, it may be more convenient to bond such elements to the ends of the honeycomb cell walls, but, in general, it is preferred to bond the glass elements to the base of the support.

In one practical example, a curved, for example spherical or parabolic mirror, for concentrating solar radiation is built up using a plurality of hexagonal tiles of coated glass which are bonded to the ends of the cell walls of a honeycomb structure support. Of course, the size of the tiles is chosen to match the honeycomb cell dimensions.

Preferably the support is formed of a cellular material. A support of cellular material may be formed in different ways, for example such a support having an open-cell structure can be made by sintering an appropriate material such as a metal or vitreous material. Preferably however, such cellular material has a closed cell structure. This feature is important because one particular field of use for the present invention lies in the manufacture of solar reflector panels, and these must clearly be sited in the open. A support material of closed cell structure can resist the ingress of water, for example rain water, which would increase the weight of the mirror during the course of time and could lead to deterioration of the strength of the support or its bond to the mirror elements. Such a closed cell material may, for example, be a plastics foam material such as a rigid polyurethane foam.

Advantageously, said support is made from a material comprising expanded vitreous material. Such material can easily be formed to provide a smooth supporting surface for the glass elements. Such a vitreous support may, for example, be a monolithic mass of expanded glass or it may be an aggregate of expanded glass particles in a binder, such as Portland cement.

Advantageously, said mirror elements are held in place relative to one another on the former prior to their bonding of the support, so as to prevent relative movement of the elements. Such elements may, for example, be lightly bonded to the former using a weak adhesive, but it is preferred that the elements should be held relative to one another using adhesive tape. In the most preferred embodiments of the invention the tape is applied along the joint lines of the elements on their non-coated faces to mask those faces from the adhesive to be used to bond the elements to the support. This has the advantage of greatly simplifying any necessary cleaning operation after the mirror has been completed.

In some preferred embodiments of the invention, the elements are held in place on the former by suction. Preferably the mirror elements are bonded to the support using a weatherproof adhesive. Preferably, for ease of application, the adhesive used is a fluid adhesive, and in order to avoid problems arising due to the escape of vapor from the adhesive as it sets, it is particularly preferred to use an adhesive of the non-solvent type.

Among several types of adhesive which are particularly suitable, special mention is made of silicone adhesives, especially those of the 'twin pack' or two component type, epoxy type adhesives and neoprene adhesives. Contact adhesives may also be used.

Another way of effecting the bonding is to use a hot-melt adhesive, that is, an adhesive which acquires its bonding function by cooling in situ between the surfaces to be bonded together. The employment of hot-melt adhesives affords a number of advantages. Among these are the facility with which they can be handled and applied to form bonding layers of predetermined thickness and uniformity, impermeability to moisture and low cost. The hot-melt adhesive is preferably one which is molten at a temperature of 150° C. or lower, preferably between 60° and 120° C.

Hot-melt adhesive formulations include an elastomeric or thermoplastic material which melts easily to a low viscosity fluid. In order to achieve solidified bonding layers of adequate strength and cohesiveness such easily meltable ingredient is blended with a higher molecular weight polymeric material. Two or more easily meltable substances (tackifiers) can be incorporated if desired in one and the same adhesive formulation.

The hot-melt adhesive may incorporate various other types of ingredients for conferring required properties, for example plasticizers, stabilizers (which are usually anti-oxidizing agents) and fillers. Generally, it is preferable to employ inorganic fillers, but organic fillers such as resins may also be used. Of course, the various ingredients used must be mutually compatible.

The bond in a mirror made according to the invention is preferably such that the mirror is highly resistant to the ingress of moisture between the coated sheet and the cellular body. The penetration of water, e.g. atmospheric moisture, between the coated elements and the support may have harmful effects on the structure and/or the physical or chemical properties of the elements and body and particularly of the optical coating. Moisture-tightness is therefore often of much importance. This is so, for example, in respect of mirrors to be used in shower rooms or bathrooms or which are to be exposed to the weather, e.g. mirrors used for concentrating solar radiation and on external walls of buildings.

Preferably the adhesive is applied to a thickness which will result in an adhesive layer in the finished mirror which is lss than 150 microns thick, because such thin layers leave a very small surface area of adhesive exposed to the environmental atmosphere. The adhesive layer or layers may incorporate reinforcement, e.g., glass or plastics fibers or webs of such fibers, or metal wires or meshes. The adhesive is preferably applied over the whole area of each element-to-support joint.

The invention extends to mirrors manufactured by a method as defined above. As has been stated, mirrors constituted by a glass sheet having a reflective coating of, for example, silver are of course very well known, but, and particularly in the case of large mirrors, they suffer from the disadvantage that they must often be made unduly heavy in order to reduce the risk of their breaking, and the weight and thickness of glass required can make such mirrors unsuitable for use in some circumstances.

It is an object of the present invention in a second aspect thereof to provide a novel form of mirror which has more favorable weight/breakage-resistance properties.

According to the present invention this objective is obtained by providing a mirror having at least one mirror element constituted by a glass element having a reflective coating on one face thereof, the mirror element being bonded to a substantially rigid cellular support with the reflective coating between them.

A cellular support will have a comparatively low weight for a given rigidity or stiffness and can serve to impart sufficient rigidity to a glass element even when such sheet is very thin, and the invention thus enables mirrors of large area, low weight and adequate rigidity to be made. Such mirrors may, for example, be used for concentrating solar energy or for surfacing walls.

Preferably, the glass element is a thin sheet, for example 2 mm or less in thickness. Such an element may conveniently be about 1 mm thick. An important advantage conferred by this feature is that less incident radiation is absorbed by the glass because it is thinner. This is especially important in the case of thermal reflectors. Another very important advantage is that the perceived image quality may be improved. Though most of the incident radiation will be reflected at the reflective surface and travel directly to the observer, some incident radiation will be reflected as it impinges on the front surface of the glass, and some reflected radiation will be reflected internally of the glass. This 'double-image' effect is made less noticeable by using thin glass. This feature also contributes further to a reduction in weight of the mirror which is important in some circumstances, for example, in the case of rotatable mirrors.

Preferably said mirror comprises a plurality of mirror elements. This is particularly advantageous in the case of large mirrors built up using thin sheets of glass in view of the fragility of large thin glass sheets.

The cellular support may be formed in different ways. For example, such a support having an open-cell structure can be made by sintering. Preferably, however, the material of which the support is made has a closed cell structure. Such a support may, for example, be made of a plastics foam material, such as polyurethane foam.

Advantageously, the cellular support comprises expanded vitreous material. Such material can easily be formed to provide a smooth supporting surface for the mirror element. Such vitreous material may be a monolithic mass of expanded glass, or it may be an aggregate of expanded glass particles in a binder.

When the mirror is of small or medium size, it is convenient to make the support in the form of a sheet or slab, but for large mirrors, the weight of that body becomes a very important consideration, and in some embodiments of the invention it is accordingly preferred that the support comprises a base to which bracing ribs are attached.

Preferably such support is an integral molding comprising a base and an upstanding network of ribs defining the walls of a honeycomb structure. This is a very convenient way of constructing the support.

In some embodiments of the invention, especially where the mirror is built up as a curved structure of a plurality of flat mirror elements bonded to the support, it may be more convenient to bond such elements to the ends of the honeycomb cell walls, but in general it is preferred to bond the mirror element or elements to the base of the support.

Reference has been made to the use of a mirror comprising a plurality of coated glass sheets. Such constructions are useful, for example, where it is desired to make a mirror of a large area.

In one practical example, a curved, e.g. spherical or parabolic mirror for concentrating solar radiation is built up using a plurality of hexagonal tiles of coated glass which are bonded to the ends of the cell walls of a honeycomb structure support. Of course, the size of the tiles is chosen to match the honeycomb cell dimensions. Again, a plurality of tiles may be used to build up a flat mirror. For example, a plurality of reflecting glass tiles may be bonded to a cellular support to form a larger mirror unit which can be incorporated in a wall of a building.

Preferably, each mirror element is bonded to the cellular support using a weatherproof adhesive. Preferably, for ease of application, such adhesive is a fluid adhesive, and in order to avoid problems arising due to the escape of vapor from the adhesive as it sets, it is particularly preferred to use an adhesive of the non-solvent type. Among several types of adhesive which are particularly suitable, special mention is made of silicone adhesives, especially those of the 'twin pack' type, epoxy type adhesives and neoprene adhesives. Contact adhesives may also be used.

Another way of effecting the bonding is to use a hot-melt adhesive, that is, an adhesive which acquires its bonding function by cooling in situ between the surfaces to be bonded together. The employment of hot-melt adhesives affords a number of advantages. Among these are the facility with which they can be handled and applied to form bonding layers of predetermined thickness and uniformity, impermeability to moisture and low cost.

The hot-melt adhesive is preferably one which is molten at a temperature of 150° C. or lower, preferably between 60° and 120° C. Hot-melt adhesive formulations include an elastomeric or thermoplastic material which melts easily to a low viscosity fluid. In order to achieve solidified bonding layers of adequate strength and cohesiveness, such easily meltable ingredient is blended with a higher molecular weight polymeric material. Two or more easily meltable substances (tackifiers) can be incorporated if desired in one and the same adhesive formulation.

The hot-melt adhesive may incorporate various other types of ingredients for conferring required properties, for example, plasticizers, stabilizers (which are usually anti-oxidizing agents) and fillers. Generally, it is preferable to employ inorganic fillers, but organic fillers such as resins may also be used. Of course, the various ingredients used must be mutually compatible.

The bond in a mirror according to the invention is preferably such that the mirror is highly resistant to the ingress of moisture between the coated sheet and the cellular body. The penetration of water, e.g. atmospheric moisture, between the coated sheet and the cellular body may have harmful effects on the structure and/or the physical or chemical properties of the sheet and body and particularly of the optical coating. Moisture-tightness is therefore often of much importance. This is so, for example, in respect of mirrors to be used in shower rooms or bathrooms or which are to be exposed to the weather, e.g. mirrors used for concentrating solar radiation and on external walls of buildings.

Preferably the thickness of the layer of adhesive in the mirror is less than 150 microns, because such thin layers leave a very small surface area of adhesive exposed to the environmental atmosphere. The adhesive layer or layers may incorporate reinforcement, e.g., glass or plastics fibers or webs of such fibers, or metal wires or meshes. Preferably the adhesive is present over the whole area of the mirror element-to-support joint or joints.

Various preferred embodiments of the invention will now be described by way of example with reference to the accompanying diagrammatic drawings in which:

FIGS. 1, 2 and 3 are cross-sectional views of three embodiments of mirror according to the second aspect of the invention;

FIG. 4 is a perspective view of an embodiment of mirror in accordance with both aspects of the invention;

FIGS. 5 and 6 are respectively plan and sectional views of a second embodiment in accordance with both aspects of the invention, FIG. 6 being a view along the line VI—VI of FIG. 5.

Figure 7:
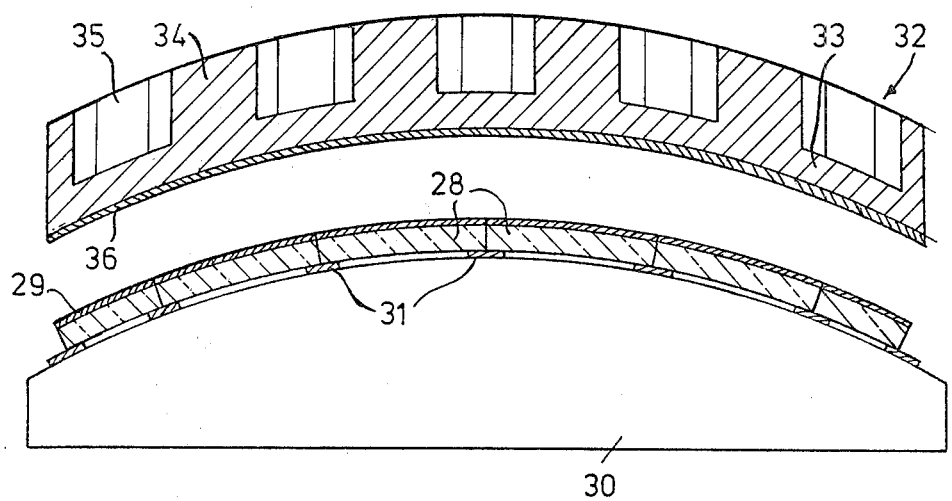
FIG. 7 illustrates a method of manufacturing a mirror in accordance with the first aspect of the invention.

In FIG. 1, a sheet 1 of soda-lime glass bears a reflective coating 2 of aluminium and is bonded by means of a glue layer 3 to a sheet 4 of expanded glass.

In FIG. 2, a sheet 5 of glass bears a reflective coating 6 of silver and is bonded by a glue layer 7 to a sheet 8 of expanded glass particles held together by a binder.

In FIG. 3, which illustrates a variant of the embodiment of FIG. 2, a sheet of glass 5 bearing a reflective coating 6 of silver is bonded by a glue layer 7 to a honeycomb structure support 9. The support 9 was integrally molded to have a flat base 10 and a network of upstanding bracing ribs 11 constituting the walls of open honeycomb cells 12. The glue layer 7 bonds the glass sheet 5 to the flat base 10 of the support 9. The support 9 was molded using expanded glass particles and a binder.

In FIG. 4 a plurality of tiles 13 of glass, each bearing a reflective coating 14 of copper, are bonded by a glue layer 15 to a sheet 16 of expanded glass.

In FIGS. 5 and 6, a circular parabolic mirror 21 is made by bonding a plurality of hexagonal glass tiles 22 to a honeycomb support 23. The reflective coatings on the tiles 22 and the adjacent glue layer which bonds the tiles to the upper ends 24 of the walls 25 which stand up from the base 26 of the honeycomb support 22 to define cells 27 are not shown in the drawings.

FIG. 7 illustrates the manufacture of a concave cylindrical mirror. A plurality of curved glass elements 28 bearing reflective coatings 29 on their upper faces are laid on a convex part-cylindrical former 30. Adhesive tape 31 is applied along the joint lines of the glass elements 28 serving to hold those elements to each other to preserve their relative positions on the former 30 and mask their lower (uncoated) faces. A support 32 has a concave part-cylindrical base 33 and bracing ribs 34 which define honeycomb cells 35. A layer of adhesive 36 is applied to the base of the support 32, and this is lowered onto the glass elements so that they become bonded thereto. Alternatively, double-sided adhesive tape may be used, which serves the additional purpose of temporarily bonding the glass elements 28 to the former 30.

In a variant, the former 30 is constituted as an air-box having a plurality of holes in its upper surface, so that when the air-box is aspirated, the glass elements 28 are held thereto by suction. Adhesive masking tape such as 31 may also be used if desired.

EXAMPLE 1 (FIG. 1)

A glass sheet 1 which was 3 mm thick was bonded to a 6 mm thick sheet 4 of expanded glass using a glue layer 3. The glue used was a silicone composed of RTV 121 with 0.5% of 10028 catalyzer from Rhone-Poulenc. The mirror was manufactured in the following manner.

The support 4 was placed horizontally on a support and was first covered with a layer of a primer composition to improve adherence. The support was then covered with a layer of the adhesive. The primer was of the MB type of Rhone-Poulenc. This was allowed to dry for 5 to 10 minutes.

The aluminum coating 2 on the glass sheet 1 after being covered with the same primer was then brought into contact with the layer of adhesive and the assembly was subjected to slight pressure, e.g. by calendering. The adhesive layer 3 provides protection against the penetration of moisture and other atmospheric agents, thus preventing premature destruction of the aluminum layer 2 by chemical corrosion. The sheet 4 provides a support for the glass sheet 1, thus rendering the mirror more robust and rigid.

EXAMPLE 2 (FIG. 2)

A 1.5 mm thick glass sheet 5 was bonded to a 10 mm thick sheet 8 made by molding a mixture of cellular glass beads and a binder. The binder was Portland cement.

The silver coated glass sheet 5 and cellular support sheet 8 were joined by a silicone adhesive layer 7 resistant to penetration by water and extending over the entire area of the mirror. The glue used was composed of RTV 573 with 1% of XY110 from Rhone-Poulenc.

The mirror was manufactured in the following manner.

The support 8 was disposed on a horizontal surface and was first covered with a layer of a primer composition improving the adherence. The support was further covered with a layer of the adhesive. The primer was of the MB type of Rhone-Poulenc. This was allowed to dry for 5 to 10 minutes.

The silver coating 6 on the glass sheet 5 after being covered with the same primer was then brought into contact with the layer of adhesive and the assembly was subjected to slight pressure, e.g. by calendering. The adhesive layer 7 provides protection against the penetration of moisture and other atmosphere agents thus preventing premature destruction of the silver layer 6 by chemical corrosion. The sheet 8 provides a support for the glass sheet 5, thus rendering the mirror more rigid and robust. This is a particularly important advantage where it is desired to use a thin, e.g. 2 mm thick or less, glass sheet, since as will be appreciated, a large glass sheet of that thickness is extremely fragile.

EXAMPLE 3 (FIG. 3)

A 1 mm thick sheet 5 of glass bearing a reflective coating 6 of silver was bonded by a glue layer 7 of polyester to a honeycomb structure cellular support 9.

The glue was composed of (parts by weight)
68,4 of Stratyl A 116 from Rhone-Poulenc
30 of Stratyl 303 from Rhone-Poulenc
1,5 of 50% methylethylketone hydroperoxide in methylphalate
0,1 of cobalt octoate (6% metal) (Rhone-Poulenc)

The use of a primer to improve the adherence is not necessary and the manner of manufacturing the mirror is the same as in the previous Examples except for the primer, which is not used.

EXAMPLE 4 (FIG. 4)

A plurality of glass tiles 13 each measuring 10 cm square by 1 mm in thickness were bonded to a supporting sheet 16 of cellular expanded glass 5 mm in thickness using a layer 15 of polyester adhesive. The tiles of glass bear a reflective coating 14 of copper.

The glue used was a polyester composed of:
78,4 parts by weight of Stratyl A 115 from Rhone-Poulenc
20 parts by weight of Stratyl 302 from Rhone Poulenc
1,5 parts by weight of 50% methylethylketone hydroperoxide in methylphalate
0,1 parts by weight of cobalt octoate (6% metal) (Rhone-Poulenc)

With this polyester adhesive, the use of a primer to improve the adherence is not necessary.

The mirror was manufactured in the following manner. The glass tiles 13 were laid with their coated faces up on a flat horizontal table to serve as a former. A frame was applied around the edges of the tiles to hold them in position. The tiles were then coated with a layer of the adhesive 15, and the supporting sheet 16 was then applied.

EXAMPLE 5 (FIGS. 5 AND 6)

A plurality of flat hexagonal glass tiles 22, each 1 mm thick and 19 cm in greatest diagonal and having a reflective layer of silver with successive protective layers of copper and paint (not shown), were bonded to a honeycomb structure support 23 using a silicone adhesive to form a generally parabolic mirror 21 for concentrating solar radiation.

The support 23 was made by molding expanded glass particles mixed with a concrete binder.

The coated glass tiles are first covered with a layer of a primer composition improving the adherence. The support is further covered with a layer of the adhesive. The primer is of the 10058 type from Rhone-Poulenc. This is allowed to harden for 24 hours.

The glue used was a silicone composed of RTV 589 with 4% of XY85 catalyzer from Rhone-Poulenc.

The manner of manufacturing the mirror is the same as was described in Example 4 save that a convex generally parabolic support was used.

EXAMPLE 6 (FIGS. 2 AND 4)

A 1.5 mm thick glass sheet 5 was bonded to a 10 mm thick sheet 8 made by molding a mixture of cellular glass beads and a binder. The binder used was Portland cement.

Instead of being coated with silver (FIG. 2) or copper (FIG. 4) the glass sheets 5 were provided with an aluminum reflective coating 6. The aluminium coated glass sheet 5 and cellular support sheet 8 were joined by a hot-melt adhesive layer 7 resistant to penetration by water and extending over the entire area of the mirror.

The formation of the hot-melt adhesive in parts by weight was as follows:

| | |
|---|---|
| EVA 607 (ethylene/vinyl acetate copolymer manufactured by Union Carbide Corp.) | 40 |
| DYLT (ethylene homopolymer manufactured by Union Carbide Corp.) | 5 |
| CKM-2400 (tackifier based on phenolic resin, manufactured by Union Carbide Corp.) | 15 |
| KLYRVEL 90 (plasticizer and tackifier containing hydrocarbons, manufactured by Velsicol Chemical Corp.) | 7.5 |
| PICCOLYTE A-115 (polyterpene-based tackifier manufactured by Pennsylvania Industrial Chemical Corp.) | 12.5 |
| BE SQUARE 190–195 (microcrystalline wax manufactured by Bareco Div. of Petrolite Corp.) | 20 |
| ANTIOXYDANT 330 (supplied by Ethyl Corp.) | 0.1 |

The water permeability of the adhesive when set is less than 0.5 grams $H_2O$ per $m^2$ surface per 24 hours per mm thickness and per cm Hg pressure.

The mirror was manufactured in the following manner. The coated glass sheet 5 was disposed on a horizontal surface. A piece of silicone paper covered on one surface with a layer of the hot-melt adhesive 20μ thick was cut from stock, the dimension of the cut piece being slightly greater than the dimensions of the mirror. This piece of material was then placed on the aluminum layer 6 of the mirror component with the hot-melt adhesive layer in contact with that layer. Slight pressure was then applied to the silicone paper over the entire area of the mirror component so as to cause the adhesive layer to adhere. Next, the margins of the adhesively covered silicone paper sheet projecting from the mirror edges were cut off with a knife or razor. The silicone paper was then peeled away, leaving the adhesive layer 7 in place. The cellular sheet 8 was then placed in position.

The resulting assembly was calendered while cold to insure uniform distribution of the adhesive and elimination of any air bubbles. After this operation, the assembly was brought to 110° C. in an oven, at atmospheric pressure, for 20 minutes. The assembly was then cooled and was ready for immediate use.

The resulting mirror was tested in a salt fog. In this test, the mirror was placed in a chamber at a temperature of 40° C. in a saturated saline atmosphere. Examination of the mirror after quite a large number of hours, revealed no deterioration in the reflective layer of the mirror, whereas a conventional mirror was rendered useless by treatment in an identical manner.

Similar results were obtained when using a hot-melt layer 40μ thick deposited on a silicone paper support marketed by Euro-M, the "hot-melt" containing inter alia butyl and wax. The water-permeability of such adhesive, expressed in the same units as before, was less than 0.1.

It is sometimes advantageous to pre-heat the coated glass sheet 5, e.g. to about 60° C., before applying the hot-melt adhesive thereto.

As a variant of the manufacturing method just described, a cellular glass sheet can be used instead of the sheet 8.

In an alternative manufacturing method, after placing the cellular support sheet 8 in position, the resulting assembly is heated to 120° C. for 20 minutes and the hot assembly is then subjected to pressure, e.g. by calendering as above referred to. The assembly is then cooled and is ready for immediate use.

In a variant embodiment, the reflective layer 6 was of aluminium.

In a further variant, the reflective layer 6 was covered with a paint layer (not shown) prior to assembly.

In yet another variant, glass tiles 13 (FIG. 4) were substituted for the sheet 5.

EXAMPLE 7 (FIG. 7)

A plurality of glass tiles 28 part-cylindrically curved and rectangular in plan are to be bonded to a honeycomb structure support 32 via a glue layer 36. The support is formed of ordinary concrete.

The mirror was manufactured in the following manner. A convex part-cylindrical former 30 complementary in shape to the support 32 was selected and a network of double sided adhesive tape 31 was applied to the former in a predetermined manner so that the glass tiles 28 could be applied thereto with their edges meeting over the tape. The double sided tape 31 was thus caused to bond to the uncoated faces of the tiles 28 along all their joint lines, to mask those faces of the tiles from the adhesive 36 used to bond the tiles to the support.

The support 32 was coated with a layer 36 of adhesive and was lowered onto the glass tiles 28 on the former 30.

The adhesive used may be any of those recited in Examples 1 to 5, a primer being applied as necessary.

In a variant, the adhesive is applied to the glass tiles 28 and not to the support. In this case, the adhesive used in any of Examples 1 to 6 may be used.

In a further variant adhesive is applied both to the support 32 and the tiles 28. For example, a contact adhesive may be used.

In yet a further variant the support 32 was a flat slab of ordinary concrete, the former 30 also being flat.

In still another variant the support was made from a cellular material as recited in any of Examples 1 to 6.

It will be appreciated that any feature of any Example may be substituted for the corresponding feature of any other Example, thus in particular, the reflective (and other coatings) applied to the glass sheets or tiles are interchangeable, as are the adhesives used.

It thus will be seen that the objects of this invention have been fully and effectively accomplished. It will be realized, however, that the foregoing preferred specific embodiment has been shown and described for the purpose of illustrating the functional and structural principles of this invention and is subjected to change without departure from such principles. Therefore, this invention includes all modifications encompassed within the spirit and scope of the following claims.

What is claimed is:

1. A method of manufacturing a curved mirror having a solar reflective surface of large area sufficient to concentrate solar energy for use as a solar reflective panel, said method comprising the steps of
    selecting a former of large area and curved shape complementary to the large area and curved shape of the mirror solar reflective surface which is to be used for concentrating solar energy,
    applying to such former a plurality of mirror elements in substantially juxtaposed relationship, to form a solar reflective surface each mirror element being constituted by a glass element having a reflective coating on one face thereof, and
    applying and adhesively bonding directly to the so positioned mirror elements a preformed substantially rigid unitary structural support of similar large area and curved shape made from material comprising expanded vitreous material.

2. A method as defined in claim 1 wherein said glass element is constituted by a sheet.

3. A method as defined in claim 2, wherein said glass sheet is 2 mm or less in thickness.

4. A method as defined in any one of the preceding claims wherein said mirror elements are bonded to the support with their reflective coatings located between the support and their glass elements.

5. A method as defined in claim 1, 2 or 3, wherein said support has a cellular structure.

6. A method as defined in claim 5 wherein said cellular support is formed as an integral molding comprising a base and an upstanding network of ribs defining the walls of a honeycomb cell structure.

7. A method as defined in claim 6 wherein said glass elements are bonded to the base of the support.

8. A method as defined in claim 5 wherein said support is formed using a cellular material.

9. A method as defined in claim 8 wherein said cellular material has a closed cell form.

10. A method as defined in claim 1, 2 or 3 wherein said mirror elements are held in place relative to one another on the former prior to their bonding to the support.

11. A method as defined in claim 10 wherein said mirror elements are held relative to one another using adhesive tape.

12. A method as defined in claim 12 wherein said tape is applied along the joint lines of the elements on their non-coated face to mask those faces from the adhesive to be used to bond the elements to the support.

13. A method as defined in claim 10 wherein said elements are held in place on the former by suction.

14. A method as defined in claim 1 or 2 wherein said mirror elements are bonded to said support using a weatherproof adhesive.

15. A method as defined in claim 14 wherein the adhesive used is a fluid adhesive.

16. A method as defined in claim 14 wherein the adhesive used is an adhesive which sets substantially without the evolution of vapor.

17. A method as defined in claim 16 wherein said adhesive is selected from silicone adhesives, epoxy type adhesives and neoprene adhesives.

18. A method as defined in claim 16 wherein the adhesive used is a hot-melt adhesive.

19. A method as defined in claim 14 wherein said adhesive is applied to a thickness which will result in an adhesive layer in the finished mirror which is less than 150 microns thick.

20. A method as defined in claim 14 wherein the adhesive is applied over the whole area of each element-to-support joint.

* * * * *